US007769853B2

(12) United States Patent
Nezamzadeh

(10) Patent No.: US 7,769,853 B2
(45) Date of Patent: Aug. 3, 2010

(54) METHOD FOR AUTOMATIC DISCOVERY OF A TRANSACTION GATEWAY DAEMON OF SPECIFIED TYPE

(75) Inventor: Shahrokh Nezamzadeh, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 11/761,624

(22) Filed: Jun. 12, 2007

(65) Prior Publication Data

US 2008/0310431 A1 Dec. 18, 2008

(51) Int. Cl.
*H04L 12/28* (2006.01)
*H04L 12/26* (2006.01)

(52) U.S. Cl. ....................................... 709/224; 370/401

(58) Field of Classification Search ....................... None
See application file for complete search history.

(56) References Cited

U.S. PATENT DOCUMENTS 5,226,132 A * 7/1993 Yamamoto et al. .......... 711/209
5,493,661 A * 2/1996 Alpert et al. ................ 711/208
5,511,192 A * 4/1996 Shirakihara ................. 718/106
5,835,963 A * 11/1998 Yoshioka et al. ............ 711/207
5,899,982 A * 5/1999 Randle ........................ 705/35
5,987,512 A * 11/1999 Madany et al. .............. 709/221
6,259,636 B1 * 7/2001 Fukuda et al. .............. 365/200
6,311,252 B1 * 10/2001 Raz ........................... 711/117
6,332,169 B1 * 12/2001 Hagersten ...................... 710/5
6,341,272 B1 * 1/2002 Randle ........................ 705/40
7,137,043 B1 * 11/2006 Kane et al. .................... 714/57
2002/0065885 A1 * 5/2002 Buonanno et al. ........... 709/205
2003/0097551 A1 * 5/2003 Fuller et al. .................... 713/1
2004/0202159 A1 * 10/2004 Matsubara et al. .......... 370/389
2005/0002341 A1 * 1/2005 Lee et al. .................... 370/254
2005/0132060 A1 * 6/2005 Mo et al. .................... 709/227
2005/0165755 A1 * 7/2005 Chan ............................. 707/3
2005/0187990 A1 * 8/2005 Pace et al. .................. 707/204
2005/0256822 A1 * 11/2005 Hollingsworth ................ 707/1
2007/0060367 A1 * 3/2007 Heler .......................... 463/42

* cited by examiner

*Primary Examiner*—Wing F Chan
*Assistant Examiner*—Kostas Katsikis
(74) *Attorney, Agent, or Firm*—Garg Law Firm, PLLC; Rakesh Garg; Jeffrey S. LaBaw

(57) ABSTRACT

A method is provided in a system wherein a transaction gateway daemon of a specified type is connected between first and second spatially separated servers, to integrate applications running on the first server with operation of the second server. The method automatically determines whether a detected address space is or is not a transaction gateway daemon of the specified type, such as a CICS transaction gateway, and includes the step of verifying that the detected address space is an Open multiple virtual storage (MVS) type of address space. The method further comprises carrying out a first set of tests pertaining to specified additional characteristics of the detected address space, and verifying that a program of the detected address space is running in a Language Environment. A second set of tests are also carried out, that are respectively associated with dubbing a task on the address space to Open MVS.

12 Claims, 3 Drawing Sheets

METHOD FOR AUTOMATIC DISCOVERY OF A TRANSACTION GATEWAY DAEMON OF SPECIFIED TYPE

BACKGROUND OF THE INVENTION

1. Field of the Invention

The invention pertains to a method for automatically discovering a transaction gateway daemon of a specified type, such as a Customer Information Control System (CICS) transaction gateway daemon running on the z/OS operating system. (CICS and z/OS are trademarks of International Business Machines Corporation in the United States and other countries). More particularly, the invention pertains to a method of the above type wherein the gateway is connected between servers such as a Java-enabled application server and a CICS transaction server. (Java is a trademark of Sun Microsystems, Inc., in the United States and other countries). Even more particularly, the invention pertains to a method of the above type wherein a series of tests is carried out on a detected address space, in order to confirm that the address space is in fact a transaction gateway of the specified type.

2. Description of the Related Art

As is well known, it is common for banks, other commercial institutions and government agencies to extensively use mainframe computers and associated transaction servers, wherein the mainframe program software is comparatively old. For example, the CICS transaction server, a product of the International Business Machines Corporation (IBM), is on the order of 40 years old. (CICS is an acronym for Customer Information Control System). However, applications required for important commercial transactions are now usually written in much newer programming languages, such as Java or C++. Thus, it has become necessary to provide a mechanism for efficiently integrating applications on a Java-enabled server or the like, with business systems running on a much older transaction server. A mechanism of this type can comprise a transaction gateway daemon or like address space, which is connected between the application enabled server and a mainframe transaction server.

Operation of an ATM provides a common illustration or example of a configuration that combines older and newer components. When a user accesses an ATM at a location in California to obtain currency, a transaction is commenced at the ATM site by a Java application, routed to a data center in Denver, and then routed to a CICS transaction server at the user's bank in Chicago. Along its route, the transaction must pass through one or more transaction gateways of the type described above. The transaction is monitored by an operator, who may be located at the bank or elsewhere.

If a problem occurs in the transaction, an important function of the monitor operator is to locate the problem along the transaction route. The operator can then take measures to correct the problem. For example, the operator could be notified that the ATM user had not received the desired amount of currency. In order to determine the location of the problem, the monitoring operator must first identify each transaction gateway that has been configured along the transaction route. It would be very beneficial to provide a tool or method that could automatically locate and verify each such transaction gateway, without the need to seek information from system customers or others.

SUMMARY OF THE INVENTION

A method is provided in a system wherein a transaction gateway daemon of a specified type is connected between first and second spatially separated servers, in order to integrate applications running on the first server with operation of the second server. The method automatically determines whether a detected address space is or is not a gateway daemon of the specified type, and includes the step of verifying that the detected address space is an Open multiple virtual storage (MVS) type of address space. The method further comprises carrying out a first set of tests pertaining to specified additional characteristics of the detected address space, and verifying that a program of the detected address space is running in a Language Environment. A second set of tests are also carried out, that are respectively associated with dubbing a task on the address space to Open MVS.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
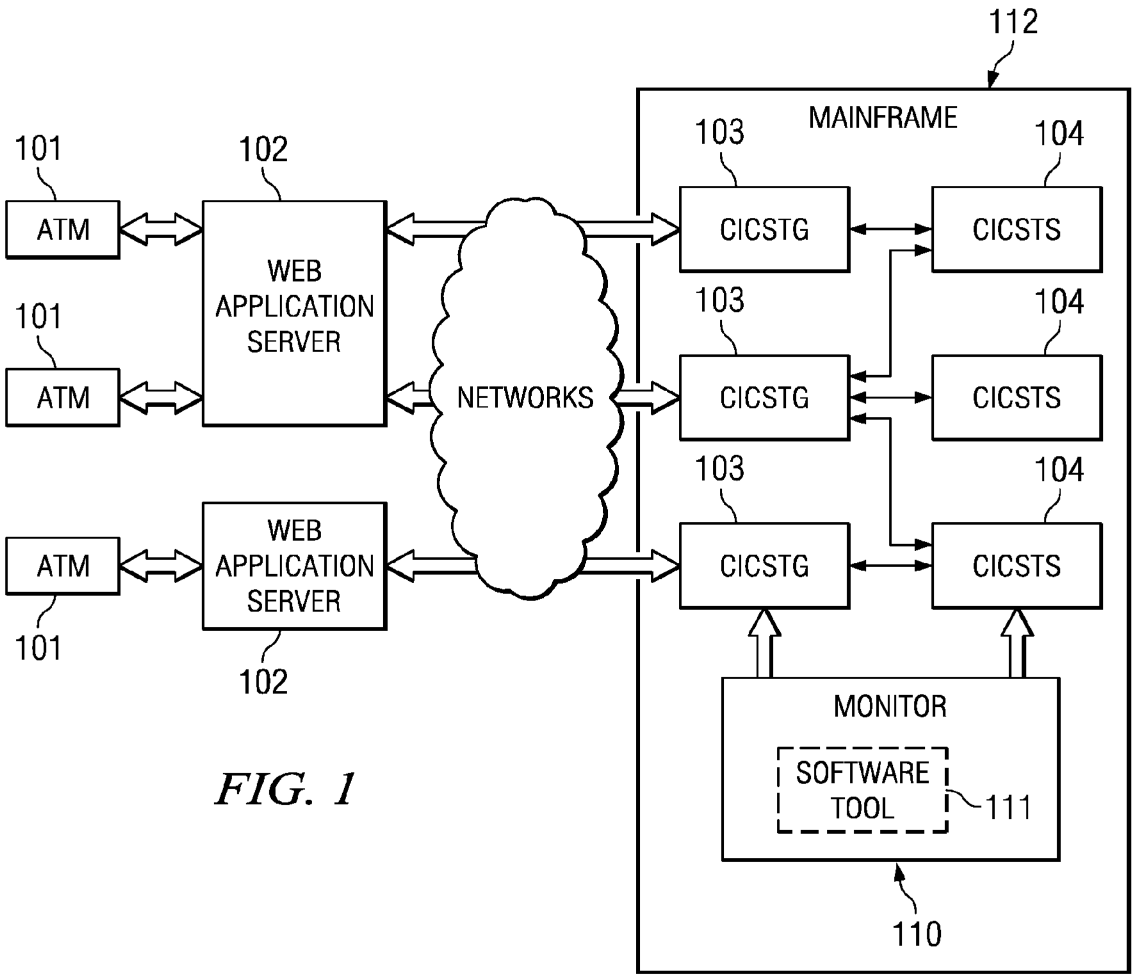
FIG. 1 is a simplified block diagram showing a system in which an embodiment of the invention is implemented.

Referring to FIG. 1, there is shown multiple application servers 102 that are provided to work in association with user devices such as ATM stations 101. Usefully, server 102 runs Java or other Unix programs, and is operable to set up transactions initiated by a user of device 101. FIG. 1 further shows multiple transaction routes or pathways established through CICS transaction gateways (CICSTG) 103 to multiple transaction servers 104.

Transaction server 104 usefully comprises a CICS transaction server (CICSTS) that runs on a mainframe computer system 112 under the z/OS Operating System. Mainframe system 112 uses a programming language such as COBOL. Each of the transaction gateways also runs under z/OS, and comprises a CICS transaction gateway daemon. As is well known, a daemon is a computer program that runs in the background, and is usually initiated as a process. Herein, a transaction gateway or transaction gateway daemon, also known as an address space or a region, is a collection of programs for carrying out a specified process or task. The transaction gateway daemon 103 running under the z/OS Operating System 112 can also be thought of as a middle tier that connects the application servers 102 and transaction servers 104.

Referring further to FIG. 1, there is shown a monitor 110 provided to monitor transactions that occur in the CICS transaction gateway as well as server environments. Monitor 110 may, for example, use a monitoring component known as OMEGAMON, which is a registered trademark of IBM. If a problem occurs in a transaction initiated at ATM 101, monitor 110 must discover each of the gateways 103 that are included in the transaction, so that each gateway can be searched for a possible fault. While monitor 110 is able to locate address spaces on z/OS that potentially may be one of the transaction gateway daemons 103, it is necessary to positively confirm that each such address space either is or is not a CICS gateway of the transaction. Accordingly, an embodiment of the invention is operable to automatically carry out a series of tests, in order to determine whether a discovered address space is or is not one of the gateway daemons 103. The embodiment, which is usefully implemented in monitor 110 as a software tool 111, makes it unnecessary to seek information from customers or others. Without this tool, it is generally necessary to have system customers identify their transaction gateway regions.

Upon detecting an address space, the tool 111 carries out the respective tests to determine whether or not the detected address space has certain pre-specified characteristics. If the address space is found to possess all of the characteristics, the detected address space is confirmed to be an active CICS transaction gateway (CICSTG) region, and may thus be one of the gateways 103. On the other hand, if the detected address space lacks any of the characteristics, it is clearly not one of the transaction gateways.

Figure 2:
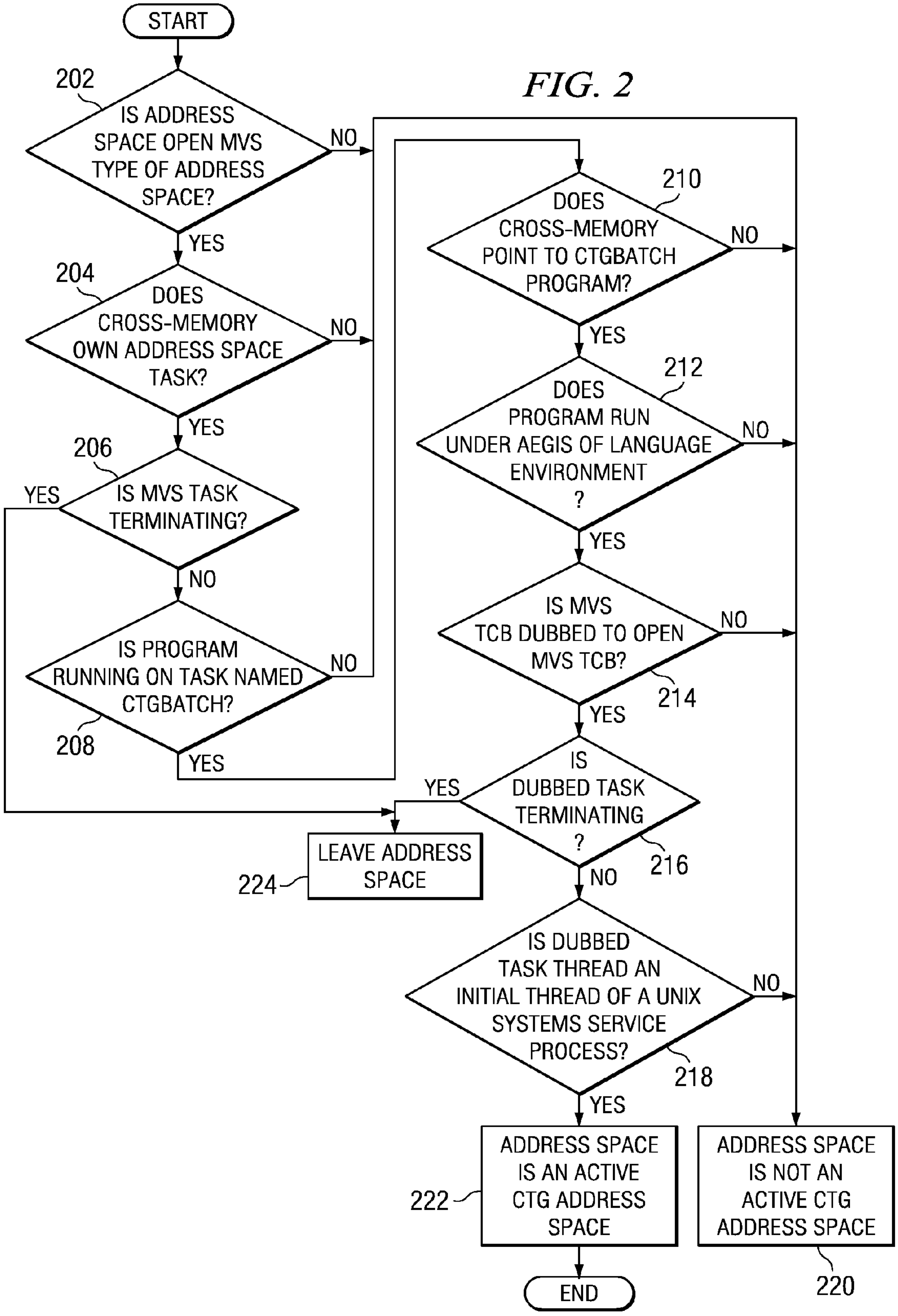
FIG. 2 is a flow chart depicting steps for a method comprising an embodiment of the invention.

Referring to FIG. 2, there is shown a set of tests that comprises a series of steps, wherein each step queries or examines a possible characteristic of the detected address space. Thus, at step 202 the tool 111 determines whether or not the address space is an Open Multiple Virtual Storage (MVS) type of address space, which is an operating system closely associated with Unix. (MVS is a trademark of International Business Machines Corporation in the United States and other countries). If the address space has this characteristic, the examination proceeds to step 204, to determine whether the address space contains a Cross-Memory owning task. Cross-Memory is a particular arrangement that uses a task control block (TCB) in order to pass data between address spaces; in this case between the transaction gateways 103 and the transaction servers 104. If the address space does not have Cross-Memory, it must be using a rogue program, and therefore the address space cannot be a CICS transaction gateway. At step 206, if the MVS task is found to be terminating, tool 111 departs from the address space as a safety measure, as indicated by step 224.

At steps 208 and 210, it should be found that the name of the first program running on the address space task is CTGBATCH, if the address space is a CICS transaction gateway. Also, Cross-Memory owning task should point to the CTGBATCH program. If the examination reaches step 212, it must then be confirmed that the CTGBATCH program is running under the aegis of Language Environment. This is an environment used in mainframe computers that allows programs written in high-level languages to run, and can thus run Unix applications, such as Java or C++, on the mainframe computers.

At step 214, the software tool 111 determines whether the MVS task TCB has been dubbed, that is, made to look like a task of Open MVS TCB (OTCB). As described above, Open MVS is closely associated with Unix. At step 216, if the dubbed OTCB task is found to be terminating, the tool 111 departs from the address space as a safety measure. Finally, at step 218 the software tool 111 determines whether the dubbed thread is an initial thread of a Unix System Services process.

It is seen from FIG. 2 that if the respective queries made by software tool 111 at any of the steps 202-204, 208-214, and 218 has a negative result, the detected address space is not an active CICSTG address space, as shown at step 220. However, if each of the steps 202-204, 208-214 and 218 is found to be affirmative, and it has not been necessary to leave the address space at 206 or 216 as described above, it is concluded that the address space is an active CICSTG region or address space, as shown at step 222.

Figure 3:
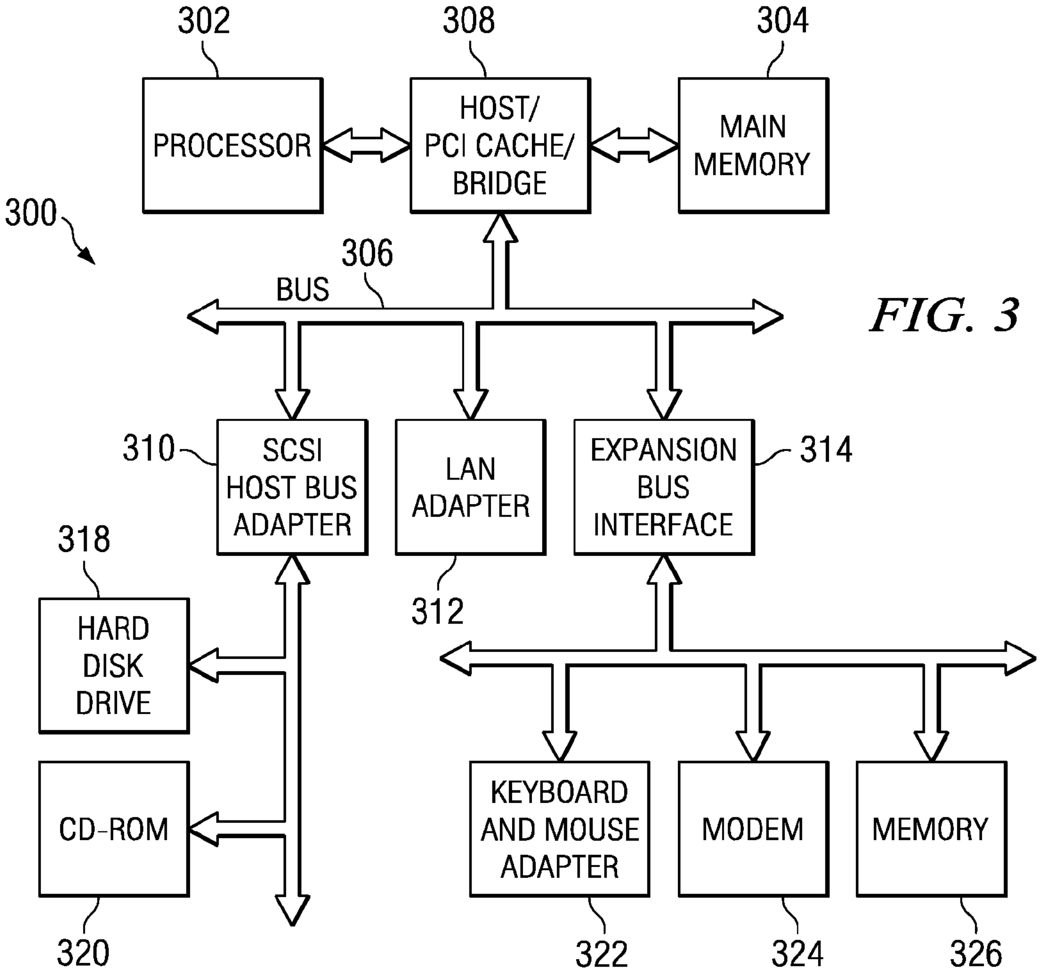
FIG. 3 is a block diagram showing a computer or data processing system that may be used in implementing an embodiment of the invention.

Referring to FIG. 3, there is shown a block diagram of a generalized data processing system 300, which may be used as a monitor or monitoring station 110 to implement the software tool 111. Data processing system 300 exemplifies a computer, in which code or instructions for implementing the processes of the present invention may be located. Data processing system 300 usefully employs a peripheral component interconnect (PCI) local bus architecture. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer system interface (SCSI) host bus adapter 310, and an expansion bus interface 314 respectively connected to PCI local bus 306 by direct component connection. SCSI host bus adapter 310 provides a connection for hard disk drive 318, and also for CD-ROM drive 320. Expansion bus interface 314 provides a connection for user interface elements such as a keyboard and mouse adapter 322, modem 324, and additional memory 326.

An operating system runs on processor 302 and is used to coordinate and provide control of various components within data processing system 300 shown in FIG. 3. Instructions for the operating system and for applications or programs are located on storage devices, such as hard disk drive 318, and may be loaded into main memory 304 for execution by processor 302.

The invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a system wherein a transaction gateway daemon of a specified type is connected between a first server and a spatially separated second server, in order to integrate applications running on the first server with operation of the second server, a method for determining whether a detected address space is or is not a transaction gateway daemon of the specified type, wherein said method comprises the steps of:

verifying at a software tool in a monitor associated with the transaction gateway daemon, that said detected address space is an Open multiple virtual storage (MVS) type of address space, wherein an instruction of the software tool is executed by a processor;

carrying out at the software tool, a first set of tests pertaining to specified further characteristics of said detected address space, wherein an address space is one of (i) a transaction gateway, and (ii) a transaction gateway daemon;

verifying at the software tool, that a program of said detected address space is running in a Language Environment; and carrying out at the software tool, a second set of tests that are respectively associated with dubbing a task of said detected address space to Open MVS, wherein dubbing the task makes the task appear similar to a task of Open MVS task control block (OTCB), wherein a task control block is a structure configured to pass data between address spaces.

2. The method of claim 1, wherein:

one of the tests of said first set comprises verifying that a task of the detected address space is a Cross-Memory owned task.

3. The method of claim 2, wherein:

tests of said first set further include ensuring that an MVS task of said address space is not terminating, determining whether a program running on said task is named CTGBATCH, and determining whether said Cross-Memory owning said task points to said CTGBATCH program.

4. The method of claim 1, wherein:

tests of said second test include determining whether an MVS task of said address space is dubbed as an Open MVS task, ensuring that said dubbed task is not terminating, and determining whether a thread of said dubbed task is an initial thread of a Unix Systems Services process.

5. The method of claim 1, wherein:

said specified type is a CICS, and said transaction gateway daemon is confirmed to be a CICS transaction gateway daemon when all of said verifications and tests are determined to be affirmative.

6. The method of claim 1, wherein:

respective steps of said method are automatically carried out by a specified software tool.

7. In a system wherein a transaction gateway daemon of a specified type is connected between a first server and a spatially separated second server, in order to integrate applications running on the first server with operation of the second server, a computer program product in a computer readable storage medium for determining whether a detected address space is or is not a transaction gateway daemon of the specified type, wherein said computer program product comprises:

first instructions in a software tool in a monitor associated with the transaction gateway daemon, for verifying that said detected address space is an Open multiple virtual storage (MVS) type of address space, wherein an address space is one of (i) a transaction gateway, and (ii) a transaction gateway daemon;

second instructions in the software tool, for carrying out a first set of tests pertaining to specified further characteristics of said detected address space;

third instructions in the software tool, for verifying that a program of said detected address space is running in a Language Environment; and fourth instructions in the software tool, for carrying out a second set of tests that are respectively associated with dubbing a task of said detected address space to Open MVS, wherein dubbing the task makes the task appear similar to a task of Open MVS task control block (OTCB), wherein a task control block is a structure configured to pass data between address spaces.

8. The computer program product of claim 7, wherein:

one of the tests of said first set comprises verifying that a task of the detected address space is a Cross-Memory owned task.

9. The computer program product of claim 8, wherein:

tests of said first set further include ensuring that an MVS task of said address space is not terminating, determining whether a program running on said task is named CTGBATCH, and determining whether said Cross-Memory owning said task points to said CTGBATCH program.

10. The computer program product of claim 7, wherein:

tests of said second test include determining whether an MVS task of said address space is dubbed as an Open MVS task, ensuring that said dubbed task is not terminating, and determining whether a thread of said dubbed task is an initial thread of a Unix Systems Services process.

11. The computer program product of claim 7, wherein:

said specified type is a CICS, and said transaction gateway daemon is confirmed to be a CICS transaction gateway daemon when all of said verifications and tests are determined to be affirmative.

12. The computer program product of claim 7, wherein:

respective instructions of said computer program product are automatically carried out by a specified software tool.

* * * * *